June 19, 1956  P. M. WRIGHT  2,750,727
AUTOMATIC HEADER CONTROL MEANS
Filed Jan. 14, 1953                                     2 Sheets-Sheet 1
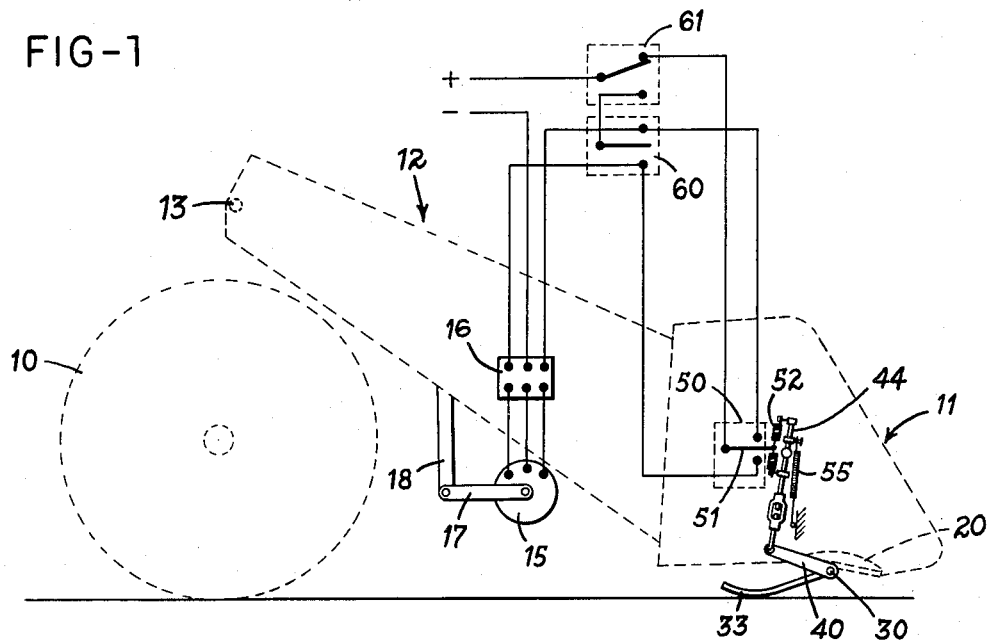
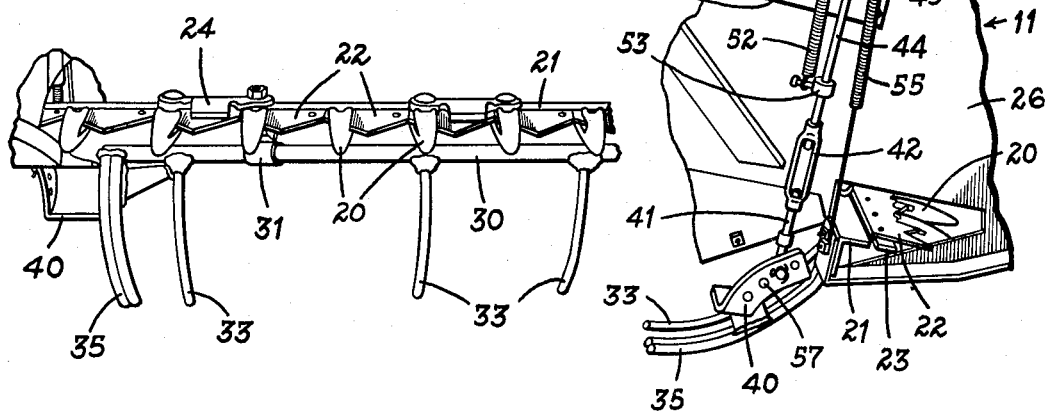
INVENTOR.
PRESTON M. WRIGHT
BY
ATTORNEYS June 19, 1956 P. M. WRIGHT 2,750,727
AUTOMATIC HEADER CONTROL MEANS
Filed Jan. 14, 1953 2 Sheets-Sheet 2

INVENTOR.
PRESTON M. WRIGHT
BY
Marechal Biebel French & Bugg
ATTORNEYS

United States Patent Office 2,750,727
Patented June 19, 1956

2,750,727

AUTOMATIC HEADER CONTROL MEANS

Preston M. Wright, Vallonia, Ind.

Application January 14, 1953, Serial No. 331,159

5 Claims. (Cl. 56—208)

This invention relates to combines, and more particularly to an automatic control for regulating the effective cutting height of the cutting head or grain table of a combine.

In the operation of a combine for the harvesting of many crops, it is very important for practical economical reasons to maintain the cutting head as close to the ground as possible in order to assure maximum yield. This is particularly true in the case of crops wherein the seed bearing portions are normally close to the ground, such for example as soybeans, lespedeza and the like, and also for harvesting grains and other seed crops which have been beaten down by storms so that their seed bearing heads are lying close to the ground. However, in all such sases it is at the same time also important to avoid running the cutters into the ground and thus causing the head to pick up dirt and stones along with the seed-bearing material as well as possibly damaging the cutters.

Although many combines are now provided with a power operated adjustment for the height of the cutting head, accurate control for this type of adjustment presents some practical difficulties. Since the adjustment is under control of the operator of the combine, who gauges by eye the proper height for the existing ground conditions as the harvesting proceeds, such operation has definite complications. For example, it is not easy for the operator to gauge the ground level accurately, in view of the fact that it is covered by the crop being cut, and this difficulty tends to reach a maximum in the case of crops such as soybeans or beaten down grain which lie close to the ground and thus offer maximum concealing action to variations in ground level. At the same time, it is with such low lying crops that an accurately low cutting height is most important, since upstanding grain crops can be effectively cut as much as a foot or more above the ground where variations in the ground contour are immaterial.

Another complicating factor involved in the visual control of the cutting height of a combine is the width of the area being cut on each pass, which may be as much as 20 feet. For example, with crops such as soybeans or seed clover, unless the cutting head is 2 inches or less above ground, a very substantial part of the seed crop may be missed, but at such low heights a correspondingly small rise in the ground, or hollow into which one wheel of the combine runs, will be sufficient to cause the cutters to run into the ground. At the same time, it is next to impossible for the operator to view a cutting area as wide as from 10 to 20 feet with sufficient accuracy to detect such small variations in ground contour, especially with the ground to a considerable extent concealed by the crop to be cut.

Since each time the cutters do run into the ground results at least in damage to the harvest by inclusion of dirt and also loss of time while the operator is cleaning out the machine, to say nothing of possible breakage of the cutter blades themselves, it is common practice as a practical matter to average these varied complicating factors by operating at a greater height than would otherwise be desirable in spite of the resulting loss in the harvest. Thus while as noted, a crop such as soybeans has so large a percentage of its yield close to the ground that it is economically desirable to operate at a cutting height of not more than two inches, it is usually found necessary to raise this head to a range of 4 to 8 inches, since otherwise the difficulties resulting from the operator's inability to avoid intermittent running into the ground appear to outweigh the advantages of the increased yield at the low height.

It is accordingly one of the principal objects of the present invention to provide an automatic control for a combine which will regulate the cutting height of the cutting head with respect to the highest part of the ground across the entire width of the cutting path, which is adjustable to establish this cutting head at a desired minimum for given crop and ground conditions, and which is effective to maintain this preset established height by automatic regulation to compensate for changes in ground contour without further attention on the part of the operator.

A further object of the invention is to provide such an automatic control for a combine wherein mechanical ground engaging members are mounted below the control members of the cutting head and in close proximity to the cutters in order to feel changes in the ground contour before such changes can affect the cutters, wherein these ground engaging members are arranged in sufficient closely spaced relation laterally of the cutting head to detect any rise or dip in ground contour capable of causing obstruction of the cutters, and wherein actuation of any one of the ground engaging members by a rise in the ground will cause the power drive for the adjustment of the cutter head to be operated in the proper direction to lift the head sufficiently to clear the obstruction.

It is also an object of the invention to provide such a control for a combine which is responsive primarily only to actual changes in ground contour of a magnitude capable of obstructing the cutters and which is not affected by stubble or the like, and more particularly it is an object of the invention to provide such a control where each ground engaging member is arranged in such relation below and behind one of the cutter guards on the cutter head that it follows in the path of the associated guard through the stubble and this is protected against actuation by the stubble.

Other objects and advantages of the invention will be apparent from the following description, the accompanying drawings and the appended claims.

In the drawings—

Fig. 1 is a diagrammatic side elevational view illustrating the application of the present invention to a combine having an electric drive for adjusting the height of the cutting head;

Fig. 4 is a fragmentary perspective view on a larger scale further illustrating the subject matter of Fig. 3; and Fig. 5 is an enlarged and more detailed view of a fragment of Fig. 1.

Figure 2:
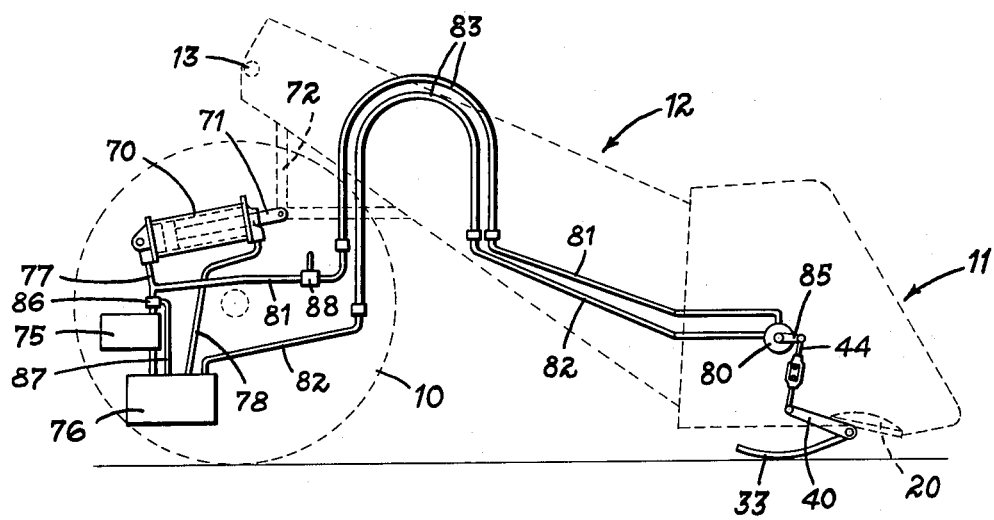
Fig. 2 is a view similar to Fig. 1 showing a combine having a hydraulic adjustment for the cutting head.

Referring to the drawings, which illustrate preferred embodiments of the present invention, Fig. 1 illustrates fragmentarily the front end of a combine including one of the main wheels 10 and the cutting head or grain table 11, which is at the front end of the elevator 12 and forms therewith a unit pivoted at 13 on the main frame (not shown) of the combine for pivotal movement effective to raise and lower the cutting level of the head. Fig. 1 shows the combine as provided with an electric drive for this adjustment of the cutting head, the drive being indicated diagrammatically as including a reversible electric motor 15 on the main frame provided with a reversing starter 16 and having an arm 17 on its drive shaft which is pivoted to an arm 18 secured to the elevator 12. Thus operation of the motor in clockwise direction as viewed in Fig. 1, will raise the cutting head, and operation of the motor in the reverse direction will lower the cutting head.

The cutting head includes the usual plurality of laterally spaced cutter guards 20 which are carried by an angle iron 21 at the front of the head and cooperate with the reciprocating cutters on the cutter bar 23, and retaining lugs 24 are bolted or riveted to angle 21 indicated in Fig. 4. The auger 25 is mounted between the end walls 26 at the front of the head to receive the cut grain heads or other cut crop from the cutters and convey it to the elevator for transmission to the other equipment within the combine, and the reel is shown fragmentarily at 27. Since these latter parts may vary with different types of combines and are not directly related to the present invention, further detailed description thereof is believed not to be required.

The control of the invention automatically regulates the height of the cutting head 12 to maintain a substantially constant operating height for the cutters 22. This control includes a rock shaft 30 pivoted below the cutter at a position as near the front of the head as is practicable and extending across substantially the full width of the head. The mounting for rock shaft 30 is shown as formed by a plurality of simple bearing brackets 31 only one of which is shown and which are bolted to the angle 21 by substitution in place of certain of the mounting bolts or rivets for the lugs 24 at adequately spaced intervals across the head.

Figure 3:
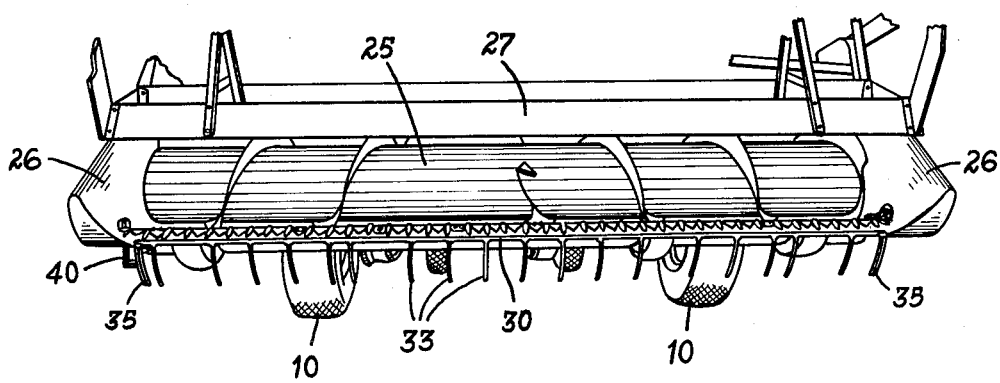
Fig. 3 is a front view in the nature of a perspective showing the cutting head of a combine embodying the present invention.

A plurarity of ground engaging feeler members in the form of fingers 33 are welded to shaft 30 in laterally spaced relation along its entire length, and the spacing of these fingers is sufficiently close to assure detection thereby of any rise in the ground contour capable of obstructing the cutters at a given operating height. For example, satisfactory results have been obtained with these fingers spaced about six inches apart across the entire width of the head, and if structural parts of the combine interfere with such arrangement for any of the fingers so as to require greater spacing forming a gap at any point, then it is desirable to have the fingers more closely spaced at one or both sides of the gap as shown in Fig. 3.

The fingers 33 ride on the surface of the ground during operation of the combine to sense variations in ground contour, and since they follow closely behind the cutters, they are ordinarily able to detect any ground rise capable of obstructing the cutters before the cutters reach the obstructing level of the rise. At the same time, it is important that the fingers 33 respond only to actual changes in ground level and are not affected by stubble and the like, and this desired result is obtained in accordance with the invention by locating each finger 33 directly in the vertical plane of one of the cutter guards 20 as shown. With this arrangement, and since each finger is of considerably smaller cross-section than the width of each cutter guard as shown, it follows the path through the stubble formed by its associated cutter guard, which weakens or pushes aside the stubble sufficiently to permit the fingers to ride substantially continuously on the ground for the desired sensing action. This result is also contributed to by forming the fingers of cylindrical rod stock of relatively small diameter, for example ⅜ inch, thus obtaining a greater deflecting action on the stubble than would be the case with a shoe or like flat feeler member.

Figs. 1 and 5 show an adjustable connection from the shaft 30 and fingers 33 to the control for the motor 15 which is effective to establish the desired cutting height for the cutting head and then automatically to cause raising or lowering of the head in response to variations in ground contour sufficient to require change of this established cutting height. At one end of the shaft 30 is a double finger 35 for increased rigidity, and a bracket 40 is welded to finger 35 and extends outwardly and upwardly therefrom. A hook 41 is connected at its lower end to bracket 40 and its upper end is threaded into a turnbuckle 42. A rod 44 is threaded into the upper end of this turnbuckle and extends slidably through a bearing block 45 carried by a mounting plate 46 bolted to the side wall 26 of the cutting head.

A single-pole double-throw switch 50 having an Off and two On positions is also carried by mounting plate 46, and its operating arm 51 is connected to the rod 44, this connection being shown as cushioned by a pair of springs 52 connected at their opposite ends to the arm 51 and to the rod 44 by collars 53. An additional spring 55 is arranged to bias the shaft 30 in the direction to press fingers 33 and 35 against the ground, the spring 55 being shown as connected at its lower end to the angle 21 and at its upper end to the rod 44 by a collar 56. The initial adjustment of the control is such that with the fingers 33 and 35 riding on the ground at the desired cutting height for cutters 22, the switch arm 51 will be in its Off position, and this adjustment is made either through the turnbuckle 42 or by changing the hook 41 to one or another of the mounting holes 57 in bracket 40. This establishes the neutral position of the ground engaging fingers in which the switch 50 is in its neutral (Off) position, the switch 50 thus constituting the control for selectively actuating the drive motor 15 to raise or lower the cutting head in response to movement of the fingers upward or downward respectively from their established neutral position. The tension of spring 55 is preferably such that with the control in this adjusted position, the fingers will be biased against the ground with sufficient force to resist raising by minor obstructions such as stubble or small clods, satisfactory results having been obtained with this spring providing a force of the order of ten pounds.

The combine is also shown as provided with a manual switch 60 arranged for direct control of the motor 15, and a selector switch 61 is connected to permit the operator of the combine to shift operation of motor 15 at his option from the automatic switch 50 to the manual switch 60. The switch 60 is a manually operated single-pole double-throw switch similar to switch 50, and the switch 61 may be a simple single-pole double-throw toggle switch having only two On positions. Thus with switch 61 in the position shown in Fig. 1, operation of motor 15 will be controlled by switch 50, while if switch 61 is shifted to engage its operating arm with its lower contact, switch 50 will be cut out, and motor 15 can then be manually controlled as desired by means of switch 60 to raise or lower the cutting head.

It is believed that the operation of the device will now be readily apparent. With the control initially adjusted as described, so long as the surface of the ground remains essentially smooth, the switch arm 51 will remain in its Off position so that motor 15 will not operate. If the cutting head approaches a rise in the ground level such as a bump, one or more of the fingers 33 and 35 will be forced to rise and thus to rotate shaft 30 in the direction to raise rod 44 through bracket 40. This will in turn move switch arm 51 to its On position and actuate motor 15 in the direction to raise the head, and the operation of the motor will continue until the head has risen sufficiently for rod 44 to return to the Off position of the switch. The cutting head will remain in its raised position so long as any of the fingers 33 or 35 are in contact with the rise in the ground, but as soon as the raised part has been passed, spring 55 will act to move the fingers downwardly in order to maintain them in contact with the ground. This will in turn cause rod 44 to move downwardly until it shifts switch arm 51 to its other "on" position, again actuating motor 15 but in the reverse direction so that the cutting head is lowered until the desired cutting height is again established and the switch 50 is again in "off" position.

It will accordingly be seen that this control will operate automatically to compensate for all variations in the ground level of a sufficient magnitude to cause obstruction of the cutters at the desired cutting height, and therefore this cutting height is maintained substantially constant with relation to the highest part of the ground being cut. It is therefore not necessary for the operator to consider such variations in ground level, and he can give his full attention to the other phases of the operation of the combine, since with the ground engaging feeler fingers arranged as described, they will detect any variation in the ground contour of sufficient magnitude to require adjustment of the cutting head.

This control is therefore especially advantageous for use in the combining of row crops such as soybeans and the like which are commonly planted in hilled rows, since even though the wheels of the combine may be traveling in the furrows between the hills, it is only necessary for one of the fingers 33 and 35 to ride along a hill in order to assure control of the cutters to the proper height with respect to such hills. In other words, the control of the present invention is effective to coordinate the cutting height of the combine with relation to the actual ground contour where the cutting is taking place and not with relation to the ground contour where the wheels of the combine are traveling, and conversely if one or both wheels should run into a dip or hollow, this also will be corrected for by the control of the invention since it would have the result of raising the feeler fingers and thus actuating the adjusting motor to raise the head until the wheels are again in a uniform level.

Fig. 2 is a diagrammatic view generally similar to Fig. 1 except that it shows the application of the operation to a combine having a hydraulically operated cutting head, and the parts in Fig. 2 which correspond to parts in Fig. 1 have been given similar reference characters. In Fig. 2, raising and lowering of the cutting head is effected by a hydraulic cylinder 70 having its piston rod 71 pivoted to a bracket 72 on the elevator 12. A hydraulic pump 75 supplies oil from a reservoir 76 to the high pressure end of cylinder 70 through a line 77, and a return line 78 leads from the low pressure end of the cylinder to the reservoir to take care of leakage and the like.

In operation, pump 75 operates continuously to supply pressure to the cylinder 70, and the surplus oil is circulated back to the reservoir through a valve 80 mounted on the cutting head. The lines 81 and 82 to and from valve 80 include flexible parts 83 to take care of the movements of the cutting head and elevator with respect to the combine frame. The valve 80 includes an operating arm 85, and in order to hold the cutting head at a desired height, this valve is adjusted to a partially open position passing only the proper amount of surplus oil required to maintain sufficient constant pressure on the high pressure end of cylinder 70 to support the weight of the elevator and cutting head. Excess pressure is taken care of by a relief valve 86 having a return line 87 to the reservoir.

The operating handle 85 of valve 80 is connected to the rod 44 for operation thereby, and the initial adjustment of the control of the invention is such that with the cutters at the desired cutting height, the fingers 33 will ride on the ground when the valve 80 is in the proper partially open position. Then whenever any of the fingers are raised by an obstruction on the ground, they will cause rod 44 to close valve 80, thus immediately increasing the pressure in cylinder 70 sufficiently to cause the cutting head to be raised until valve 80 is again opened. When the fingers 33 drop below their normal position, valve 80 will be further opened to permit the escape of oil at an increased rate providing a pressure drop in cylinder 70 and resulting lowering of the cutting head until the desired neutral position of the fingers is again established.

It will accordingly be seen that the control of the invention is equally effective on hydraulically operated combines as well as the electrically operated type previously described. Whenever it is desired to operate without the automatic control, such operation may be effected by means of a manually operated valve 88 in the return line 81, in which event it is only necessary to disconnect valve arm 85 from rod 44 and to shift valve 80 to its fully open position. Thereafter the valve 88 can be operated in the same way as valve 80 to raise or lower the pressure on cylinder 70 as may be desired to raise or lower the cutting head.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for maintaining a substantially constant cutting height for the cutting head of a combine having a reversible drive for raising and lowering said head, comprising a plurality of ground engaging feeler members, means on said cutting head pivotally supporting said feeler members in closely spaced relation along substantially the entire length of said head and below the cutters thereof to detect any substantial variation in the contour of the ground beneath said cutters and along substantially the entire length of said head as the combine advances, each of said feeler members being of a relatively small dimension in the direction of the width of said head, a control on said combine and operatively connected with said drive for selectively actuating said drive to raise or lower said head, said control having a neutral position, means on said head for biasing said feeler members into contact with the ground, means connected with said pivotally supporting means for establishing a predetermined neutral position of said feeler members, means on said combine forming an operative connection between said feeler members and said control causing actuation of said drive in the direction to raise or lower said head in response to upward or downward movement respectively of said feeler members from said predetermined neutral position, and means for adjusting said feeler members with respect to said control to establish said neutral position of said feeler members in accordance with the desired cutting height of said head.

2. Apparatus for maintaining a substantially constant cutting height for the cutting head of a combine having cutters and cutter guards on said head and having also a reversible drive for raising and lowering said head, comprising a rock shaft mounted on said cutting head below said cutters and extending along substantially the entire length of said head, a plurality of ground engaging feeler members secured to said shaft in closely spaced relation along substantially the entire length of said head to detect any substantial variation in the contour of the ground beneath said cutters and along substantially the entire length of said head as the combine advances, each said feeler member being of a smaller dimension in the direction of the width of said combine than one of said cutter guards and being secured to said shaft in substantially the same vertical plane with one of said cutter guards to align said feeler member with the path through the stubble formed by said cutter guard and thereby to minimize lifting of said feeler member by said stubble, means connected with said rock shaft for establishing a predetermined neutral position of said feeler members, and a control connected between said shaft and said drive for causing actuation of said drive to raise said head in response to upward movement of any of said feeler members from said predetermined neutral position and to cause actuation of said drive to lower said head in response to downward movement of said feeler members from said neutral position.

3. Apparatus for maintaining a substantially constant cutting height for the cutting head of a combine having a reversible drive for raising and lowering said head, comprising a rock shaft mounted on said cutting head below the cutters of said head and extending along substantially the entire length of said head, a plurality of ground engaging fingers secured to said shaft and extending downwardly and rearwardly from said shaft in closely spaced relation along substantially the entire length of said head to detect any substantial variation in the contour of the ground beneath said cutters and along substantially the entire length of said head as the combine advances, each of said fingers being of relatively small cross-sectional diameter to minimize lifting thereof by stubble and the like, a control mounted on said cutting head and operatively connected with said drive for selectively actuating said drive to raise or lower said head, said control having a neutral position, means on said head for biasing said shaft in the direction to cause engagement between said fingers and the ground, means on said combine forming a connection between said shaft and said control for shifting said control with respect to said neutral position in response to movement of said shaft, means for adjusting said connection to establish a neutral position of said fingers wherein said fingers engage the ground and said control is in said neutral position thereof, and said connection including parts cooperating with said control to actuate said drive to cause lifting of said head in response to lifting of said fingers above said predetermined neutral position by contact with a rise in the ground and to cause lowering of said head in response to downward movement of said fingers below said neutral position thereof.

4. Apparatus for maintaining a substantially constant cutting height for the cutting head of a combine having cutters and cutter guards on said head and having also a reversible drive for raising and lowering said head, comprising a plurality of ground engaging feeler members, means on said cutting head pivotally supporting said feeler members in closely spaced relation along substantially the entire length of said head below said cutters to detect any substantial variation in the contour of the ground beneath said cutters and along substantially the entire length of said head as the combine advances, each said feeler member being of a smaller dimension in the direction of the width of said combine than one of said cutter guards and being located substantially in the same vertical plane with one of said cutter guards to align said feeler member with the path through the stubble formed by said cutter guard and thereby to minimize lifting of said feeler member by said stubble, a control mounted on said combine for selectively actuating said drive to raise or lower said head, means operatively connecting said feeler members with said control for operating said control in response to pivotal movement of said feeler members, means connected with said pivotally supporting means for establishing a predetermined neutral position of said feeler members, and said control and said connecting means being constructed and arranged to actuate said drive in the direction to raise said head upon upward movement of any of said feeler members from said predetermined neutral position as the result of a rise in the ground and to actuate said drive in the direction to lower said head in response to downward movement of said feeler members from said neutral position.

5. Apparatus for maintaining a substantially constant cutting height for the cutting head of a combine having cutters and cutter guards on said head and having also a reversible drive for raising and lowering said head, comprising a plurality of ground engaging fingers of cylindrical section, means including a rock shaft mounted on said head below said cutters and extending across substantially the entire width of said head for pivotally supporting said fingers in closely spaced relation along substantially the entire length of said head below said cutters to detect any substantial variation in the contour of the ground beneath said cutters and along substantially the entire length of said head as the combine advances, each said finger being of substantially smaller diameter than the width of one of said cutter guards and being located substantially in the same vertical plane with one of said cutter guards to align said finger with the path through the stubble formed by said cutter guard and thereby to minimize lifting of said finger by said stubble, a control operatively connected to said drive for selectively actuating said drive to raise or lower said head, said control having a neutral position, means on said head for biasing said shaft in the direction to cause engagement between said fingers and the ground, means on said combine forming a connection between said shaft and said control for shifting said control with respect to said neutral position in response to movement of said shaft, means for adjusting said connection to establish a neutral position of said fingers wherein said fingers engage the ground and said control is in said neutral position thereof, and said connection including parts cooperating with said control to actuate said drive to cause lifting of said head in response to lifting of said fingers above a predetermined neutral position by contact with a rise in the ground and to cause lowering of said head in response to downward movement of said fingers below said neutral position thereof.

References Cited in the file of this patent

UNITED STATES PATENTS

| | | |
|---|---|---|
| 2,420,219 | Baldwin | May 6, 1947 |
| 2,473,655 | Lohn | June 21, 1949 |
| 2,514,764 | Herigstad | July 11, 1950 |
| 2,589,553 | Kesselring | Mar. 18, 1952 |
| 2,660,015 | Briscoe | Nov. 24, 1953 |